Apr. 24, 1923. 1,452,778
E. A. BARBET
PROCESS AND APPARATUS FOR THE RECOVERY OF THE VAPORS OF VOLATILE
LIQUIDS FROM AERIFORM MIXTURES
Filed Aug. 2, 1920
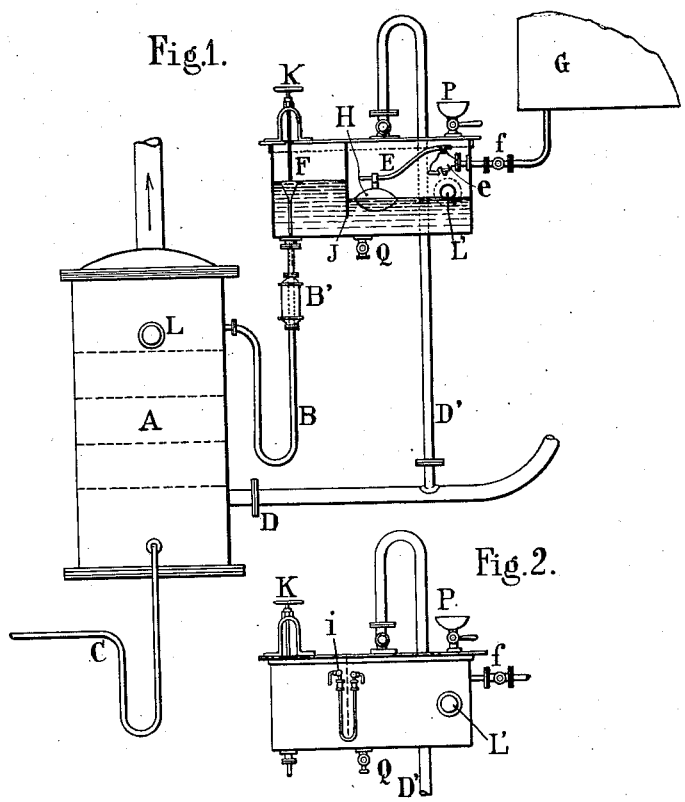
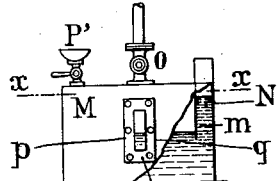
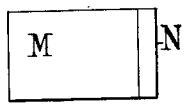
Inventor
E. A. Barbet,
By H. R. Kerslake.
Attorney Patented Apr. 24, 1923.

1,452,778

UNITED STATES PATENT OFFICE.

EMILE AUGUSTIN BARBET, OF PARIS, FRANCE.

PROCESS AND APPARATUS FOR THE RECOVERY OF THE VAPORS OF VOLATILE LIQUIDS FROM AERIFORM MIXTURES.

Application filed August 2, 1920. Serial No. 400,781.

*To all whom it may concern:*

Be it known that I, EMILE AUGUSTIN BARBET, a citizen of the French Republic, residing at Paris, France, have invented certain new and useful Improvements in the Process and Apparatus for the Recovery of the Vapors of Volatile Liquids from Aeriform Mixtures (for which I have filed an application in France Aug. 1, 1919), of which the following is a specification.

This invention has for its object to provide an improved process and apparatus for obviating the loss arising, in large reservoirs of petrol, benzine, alcohol, ether and other volatile vapors, either while filling the said reservoirs, since the filling expels from the reservoir a body of air more or less saturated with vapor, or produced simply by the action of the differences between the day and night temperatures; since the cooling at night causes an in-suction of air which becomes saturated, and inversely the heat of the sun overheats the top of the reservoirs and causes the excess of air saturated with vapors to pass out of the reservoirs.

The apparatus is illustrated in the accompanying drawing, in which:—

Figure 1 is a side view partly in section of the apparatus for discharging air from a volatile liquid reservoir and for recovering volatile vapors from the aeriform mixtures which pass out of said reservoir.

Fig. 2 is a side view of the part shown in section in Fig. 1.

Fig. 3 is a side view, partly in section of a device for admitting air to a reservoir.

Fig. 4 is a horizontal section taken on line *x—x* of Fig. 3.

The improved process consists in bringing the expelled vapors with or without being previously heated into intimate contact with a suitable solvent for the vapors to be recovered, in a plate column A for instance (Fig. 1) into which the liquid solvent is admitted by a pipe B. The liquid passing out through the pipe C, is charged with the products to be recovered which are extracted therefrom by simple distillation.

It is already known that heavy petroleum oils are excellent solvents for light volatile vapors and also that heavy tar oils dissolve benzine vapors. These properties are already utilized in one and the other industry, more particularly for recovering the benzine vapors contained in coal gas.

Water may be employed as the solvent for alcohol and cresol or any other suitable solvents may be employed in the case of ether.

But the problem solved by the present invention is not quite so simple as one requiring mere absorption.

First, large reservoirs will not stand a substantial excess of internal pressure, and certainly not the slightest vacuum. It is, therefore, necessary to effect during the night, or during the extraction of the volatile product, the indispensable re-admission of air without which the reservoir would collapse.

This free, certain and automatic re-admission of air must not act at the exit and it must overcome an internal pressure of at least fifteen or twenty centimetres of water, this slight pressure being necessary in order to assure the passage of the saturated air through the bubbling plates of the column.

Second, in order to avoid useless cost in distillation, the feeding of the column A with liquid solvent must be effected automatically as required, when air passes out from the reservoir, and it must on the contrary stop when the reservoir is sucking instead of expelling.

This is the problem which the present invention is designed to solve without requiring the slightest watching.

Absorption of the vapors.

Fig. 1 of the accompanying drawings illustrates the general arrangement of the apparatus for absorbing the vapors, the right hand portion of the figure being a section of the device for the automatic feed of the liquid solvent.

The air charged with for instance petrol vapor, passes from the top of the reservoir (not shown) and enters through the pipe D into the lower part of the plate column A. The air bubbles up in the liquid solvent (in this case a heavy oil) which descends systematically from plate to plate. The air gives up its petrol, and the oil which has absorbed it passes out through C.

When however the reservoir is sucking instead of expelling, it is necessary that the entry of oil shall be stopped automatically.

This duty is entrusted to the float-tank mounted on top of the column. The said tank is closed and divided into two unequal compartments E and F by means of a partition J which dips into the liquid intended for effecting the absorption. In the compartment E is located a float H which acts by means of a lever upon an oil inlet valve $e$.

G is a reservoir for heavy oil or other suitable liquid solvent. It is assumed that the column A can commence to operate only when there is at least 80 mm. of water pressure in the interior of the reservoir. The pipe D' branched off the pipe D conveys this pressure into the compartment E and consequently the oil is caused to rise 80 mm. in the compartment F which is in communication with the atmosphere. At this moment the oil is on a level with the outlet of the siphon tube B operating as an overflow. Then a thread-like stream of oil commences to run at the top of the column at the moment when the latter begins to work, and on the other hand the float H begins to open the valve $e$ to supply oil. If the pressure still increases in the reservoir, thus producing a more intensive bubbling-up in the column, the oil will rise a little higher in the compartment F, and the outflow through B will increase proportionally.

Such is the principle of the invention. Means have still to be provided for ascertaining whether the operations are taking place properly, and for regulating the outflows.

The siphon-tube B is fitted with a testing device B' having a window in it which allows observation of the jet of oil about to enter the column. This same tube B is extended into the tank F by means of a funnel pipe which can be raised or lowered at will by the following means:—

The funnel is fixed to a screw-threaded rod driven by means of a hand-wheel K mounted on a bracket similar to the usual valve-opening devices. On the other hand the bottom of the funnel pipe $b$ slides through a stuffing box in the outer tube B.

On the regulating tank E F there is fixed a two-branched pressure gauge $i$ which gives the exact difference between the pressures in the two compartments E and F. Glazed windows are provided, one L at the top of the oil column, and the other L' in the oil feeding casing, for observing the flow of the oil through the float valve $e$. The tank is provided with a funnel cock P for filling-in oil and a discharge cock Q.

*Automatic re-admission of air.*

The device for ensuring the automatic re-admission of air is illustrated in Figs. 3 and 4.

M is a closed tank of sheet metal divided into two unequal compartments by the partition $m$ which dips into the liquid solvent, for instance heavy oil. An upper valve O places this tank M into communication with the top of the reservoir (not shown). The small compartment N communicates freely with the atmosphere.

A glazed window R allows of ascertaining the internal level of the liquid. A line $p\ q$ marked on the glass indicates the obligatory normal level.

Assuming that the horizontal section of the compartment M is exactly nine times that of the compartment N, and that the partition $m$ dips 30 mm. into the liquid, the under these conditions, on opening the valve O and assuming that the pressure in the reservoir rises up to 20 centimetres of water (an extreme limit that will scarcely be required), the level of the liquid will not remain the same in the two compartments M and N. For the sake of simplicity, assuming that the density of the heavy oil is equal to 1.0, if we call $x$ the lowering of the level in the compartment M, and consequently 9 multiplied by the rise in the compartment N, we get the following equation:—

$$x + 9x = 200 \text{ mm.}$$

Therefore $x = 20$ millimetres. That is to say, the air imprisoned in the reservoir cannot pass out under the partition $m$.

On the contrary, the depression $y$ from which point onward the outer air, entering by way of the compartment N, will bubble up under the partition $m$ and will enter the reservoir, will be $$y = 30 \text{ mm.} + \frac{30}{9} = 33.3 \text{ mm.}$$

Therefore by this invention, by increasing at will the difference between the horizontal sections of the two compartments, the maximum vacuum in the reservoir whilst it is being emptied, can be limited to a pressure of a few millimetres of water.

The level of the oil can be ascertained from time to time. For this purpose the valve O is closed, and the funnel cock $p'$ is opened. If the level is too low, a little oil is poured in through the funnel $p'$. If it is too high, a little oil is drawn off through the cock Q'.

The improved automatic apparatus may have any desired form. It is shown in the drawing as being of rectangular shape, but it might equally well be of circular shape, in which case the straight partition $m$ would be replaced by a dip-pipe of suitable diameter.

*Regulation.*

Advantage is taken of a time when the large reservoir is being filled with petrol. The state of affairs is observed through the window L. As soon as bubbling-up commences, the pressure is noted at $i$, and thus the minimum pressure is fixed at which there commences a passage of air through the column.

B' is then examined, and the funnel pipe b is lowered by means of the hand-wheel K, until it is found that there is a suitable flow of oil at B'. Then L' is observed to see whether the valve e is supplying a corresponding contribution.

If it is not operating, the float N will be slightly weighted to make it descend further, so that it shall open the valve. Or the stock of oil is varied by opening for a moment the discharge cock Q. In the end the float must open and give the required amount. The funnel b, however, must be regulated afresh, because the fall of the level will have stopped its discharge.

When the respective adjustments have been made, it will then be merely necessary to check them from time to time. Automatic working of the apparatus is assured.

What I claim is:—

1. A process for recovering petroleum, petrol, benzol, alcohol, ether and other volatile vapors from aeriform mixtures arising in reservoirs containing substances from which said vapors are formed, consisting in discharging the aeriform mixture containing the vapors to be recovered from the reservoir containing the same, passing the mixture into a column containing a suitable absorbent, feeding additional absorbent to said column as the aeriform mixture passes through the same, regulating the absorbent feed automatically and proportionally to the quantity of vapor passing through the column and distilling the vapor from the absorbent.

2. A process for recovering volatile vapors from aeriform mixtures arising from reservoirs containing said volatile vapors consisting in discharging the aeriform mixture containing the vapors to be recovered from the reservoir containing the same, passing the mixture into an absorbing tower, feeding absorbent to said tower, utilizing the pressure of said aeriform mixture to regulate the feed of absorbent to the tower, and distilling the vapors extracted, from the aeriform mixture, from the absorbent.

3. A process for admitting air to a reservoir containing volatile liquids and for recovering vapors from the aeriform mixtures arising from said volatile liquids consisting in utilizing reductions of pressure in the reservoir to draw air into the reservoir through a liquid seal, proportioning said liquid seal to prevent air from being discharged through the same, passing aeriform mixtures containing volatile vapors from the reservoir through an absorbing column, feeding absorbent to said column, utilizing the pressure of said aeriform mixture to regulate the feed of absorbent to the column, and distilling the vapors from the absorbent.

4. In combination, an absorption tower, a tank provided with a partition dividing the interior of the tank into a plurality of communicating chambers, a pipe placing one of said chambers in communication with said tower, means for conveying aeriform mixtures containing vapors to be recovered to said tower, means for placing the other chamber into communication with the last named means whereby the second chamber is subjected to the pressure of said aeriform mixture, means for feeding absorbent liquid into said tank, and means for withdrawing the absorbent liquid containing the recovered vapors from said tower.

5. An apparatus for admitting air to a reservoir containing volatile liquids comprising a closed tank having a depending partition dividing the interior of the tank into a small and a large chamber, means for placing the small chamber in communication with the atmosphere, means for placing the large chamber in communication with the top of the reservoir, and means for observing the height of liquid contained in said chambers.

6. The process for recovering petroleum, petrol, benzol, alcohol, ether and other volatile bodies contained in the form of vapor in aeriform mixtures arising in reservoirs containing substances from which said vapors are formed, which comprises leading the aeriform mixture containing the vapors to be recovered from the reservoir into contact with a periodically renewed body of absorbent liquid and causing the rate of renewal to be varied by the variation in pressure within the reservoir.

7. The process for recovering petroleum, petrol, benzol, alcohol, ether and other volatile bodies contained in the form of vapor in aeriform mixtures arising in reservoirs containing substances from which said vapors are formed, which comprises leading the aeriform mixture containing the vapors to be recovered from the reservoir into contact with a periodically renewed body of absorbent liquid, causing the rate of renewal to be varied by the variation in pressure within the reservoir and admitting a permanent gas to the reservoir when the pressure falls below a predetermined value.

8. The process for recovering petroleum, petrol, benzol, alcohol, ether and other volatile bodies contained in the form of vapor in aeriform mixtures arising in reservoirs containing substances from which said vapors are formed, which comprises leading the aeriform mixture containing the vapors to be recovered from the reservoir into contact with a periodically renewed body of absorbent liquid, and causing the pressure within the reservoir to operate on a balanced column of the absorbent liquid adapted to deliver under varying head further quantities of absorbent liquid into contact with the aeriform mixture.

9. The process for recovering petroleum, petrol, benzol, alcohol, ether and other volatile bodies contained in the form of vapor in aeriform mixtures arising in reservoirs containing substances from which said vapors are formed, which comprises leading the aeriform mixture containing the vapors to be recovered from the reservoir into contact with a periodically renewed body of absorbent liquid, causing the pressure within the reservoir to operate on a balanced column of the absorbent liquid adapted to deliver under varying head further quantities of absorbent liquid into contact with the aeriform mixture and causing the pressure within the reservoir to operate a second balanced column of liquid adapted to admit air to the reservoir when the pressure therein falls below a predetermined magnitude and cause the aeriform mixture to pass from the reservoir into contact with the body of absorbent liquid when the pressure rises.

In testimony whereof I have signed my name to this specification.

EMILE AUGUSTIN BARBET.